Dec. 2, 1952          Z. T. PERDUE, JR            2,620,003
             BASE WITH MEAT CARVING FACILITIES
                    Filed April 3, 1950

Zack T. Perdue, Jr.
INVENTOR.

Patented Dec. 2, 1952

2,620,003

UNITED STATES PATENT OFFICE 2,620,003

BASE WITH MEAT CARVING FACILITIES

Zack T. Perdue, Jr., Rocky Mount, Va.

Application April 3, 1950, Serial No. 153,604

3 Claims. (Cl. 146—218)

The present invention relates to novel ways and means whereby cooked meat or the like may be temporarily impaled and reliably held in a set position, whereby the meat may be expeditiously yet safely carved for table use.

It is a matter of common knowledge that carving forks, clamps and other types of meat holders are not new. To use a carving fork one must be possessed of a certain amount of skill to hold the fork and meat product on a platter and to avoid, at the same time, the usual skidding of the meat. Therefore, and since carving boards and platters have no assurance against slippage and accidents, forks are used sparingly and with great caution. Many types of prong-equipped meat holders for carving trays and platters have been offered for use and since these have to be harnessed in place, and are complicated and difficult to keep clean and sanitary, they too are unpopular.

The object of the present invention is, therefore, to structurally and otherwise improve upon meat holding and carving appliances. Consequently, in carrying out the principles of the instant invention, a structural assemblage is provided in which manufacturers and users will find their long sought for needs fully met, contained and safely and satisfactorily available.

Briefly summarized, the invention herein under advisement has to do with a portable base of adequate size which lends itself to use on a table or other support, said base functioning as a "tray" to catch and hold the carved slices and serving as a foundation and retainer for the meat impaling and holding unit.

Novelty is predicated on a base which, as a general, rule, takes the form of a rectangular wooden or equivalent board, the same having appropriate hand-holds, having flat top and bottom surfaces and being provided at the center of its top surface with a recess serving as a well and as a reliable keeper seat for a novel prong-equipped meat holding unit.

Then, too, novelty is predicated on the special design and construction of the stated meat holding unit, this characterized by a base ring which fits into and is retained by the keeper seat, said ring having circumferentially spaced prongs or tines, and there being a second ring which is joined with the prongs to stabilize same and to limit the level or position of the meat above the base to facilitate handling the meat.

Novelty is also based on the aforementioned specific construction wherein the vertical tines are attached at circumferentially spaced points around the outer peripheries of said rings and wherein the lower ends of said tines fit into seating notches provided therefor about the wall of said well.

Other objects and advantages will become more readily apparent from the following description and the accompanying illustrative drawings.

In the accompanying sheet of drawings wherein like numerals are employed to designate like parts throughout the views.

Figure 1:
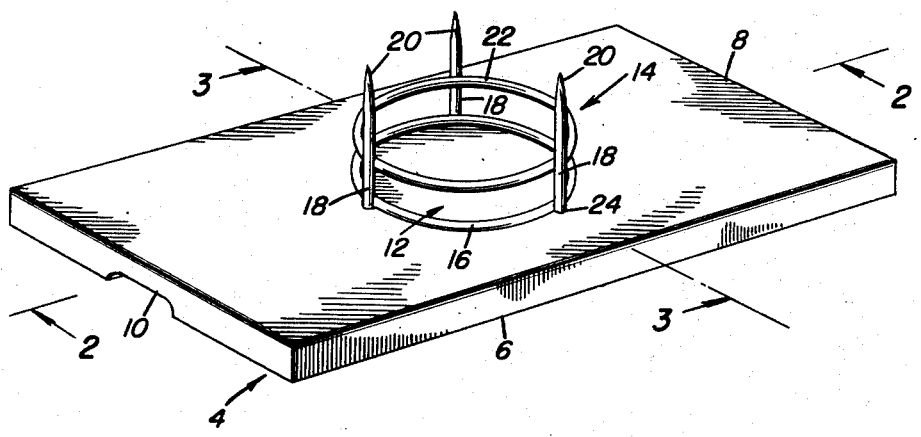
Figure 1 is a perspective view of the stated base and facilities thereon for holding meat safely during the act of slicing or carving same.
Figure 2:
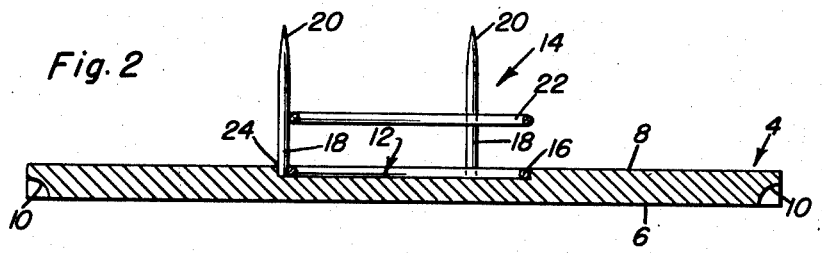
Figure 2 is a central longitudinal sectional view on the line 2—2 of Figure 1, looking in the direction of the arrows; and, Figure 3 is a central cross-section on the plane of the line 3—3 of Figure 1, also looking in the direction of the arrows.
Figure 3:
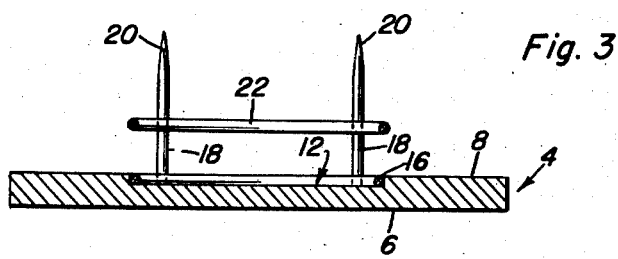

Although the base unit may be of light weight metal, commercial plastics or equivalent materials, it is preferably in the form of a substantially rectangular wooden board 4. The board is similar to bread boards which are commonly employed in kitchens. It has a flat bottom 6 to rest firmly on a table or the like (not shown) and also has a substantially flat top 8. The transverse end portions are provided with appropriate notches 10 defining suitable handgrips or hand-holds. At the central region the flat top surface is provided with a relatively shallow routed recess 12. This recess serves primarily as a keeper seat for the attachable and detachable meat holding unit 14. It may be stated here, that unit 14 may, of course, be permanently fastened to the base. It is desirable, however, that all surfaces of the base be available for washing and cleaning and that the unit 14 be removed for such purposes.

The recess 12 serves not only as an adapter and retainer for the unit 14 but, in addition, as a well or sump for collecting surplus juices from the cut meat. It is also within the purview of this invention to slightly dish (not shown) the surrounding portions of the surface 8 for trapping and pooling the stated juices in the sump.

Unit 14 is of appropriate non-corrosive metal and an open-work frame structure and characterized by a base ring 16 which is fitted snugly and firmly into the seat or recess 12. Ring 16 is provided with equi-distant vertical tines or prongs 18 whose upper ends 20 are suitably pointed to pierce and impale the meat or other food products to be carved. There is a second horizontal ring 22 and this is welded or otherwise secured to the intermediate portions of the prongs. It serves to stabilize the over-all unit and also limits the "down" position of the meat, making it possible to more easily remove the meat from the unit or holder 14 whenever necessary or desirable.

Aided by the units 4 and 14 in combined mechanical relationship the housewife will have at her disposal a unique and practical basing and holding device for meat, poultry, fish and the like for safe and reliable carving requirements.

It will be noticed that the tines 18 are welded to the outer peripheral surfaces of said rings 16 and 22 and that the lower ends of said tines are anchored in circumferentially spaced notches 24 which are provided therefor around the margin of said well. Thus, the entire unit 14 is keyed against relative rotation in said well.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. Means to assist one in safely carving a chunk of cooked meat or the like comprising a rectangular base having flat top and bottom surfaces and recessed end portions, the latter serving as hand-holds, the central portion of the flat top of said base having a circular recess, the latter constituting a keeper seat and also a juice collecting sump, a ring removably fitted in said keeper seat, a plurality of equi-distant circumferentially spaced prongs integral with and rising vertically from said ring, the upper ends of said prongs being pointed and adapted to penetrate the meat in a manner to impale and anchor same on said base, and a second ring in alignment with and elevated above and integrated with intermediate portions of said prongs.

2. Means to assist one in safely carving a chunk of cooked meat or the like comprising a rectangular wooden base having flat top and bottom surfaces and recessed end portions, the latter serving as hand-holds, the central portion of said base being routed to provide a circular recess, the latter constituting a keeper seat and juice collecting sump, a ring removably fitted in said keeper seat, a plurality of equi-distant circumferentially spaced prongs integral with and rising vertically from said ring, the upper ends of said prongs being pointed and adapted to penetrate the meat in a manner to impale and anchor same on said base, and a second ring integrated with intermediate portions of said prongs, said prongs being attached to the outer peripheral portions of said rings.

3. Means to assist one in safely carving a chunk of cooked meat or the like comprising, in combination, a base having top and bottom surfaces, a portion of the top surface having a shallow recess constituting a keeper seat and also constituting a juice collecting sump, a ring of a size corresponding to the size of said recess, the cross-section of said ring being equal to the depth of said recess and said ring fitting removably into said recess, the marginal wall of said recess being provided with equidistant, circumferentially spaced notches, a second ring corresponding in size to the size of said first-named ring and disposed in spaced parallelism above the latter, and a plurality of spaced prongs secured to the outer peripheral surfaces of the respective rings, said prongs having pointed ends extending to an elevation above the second-named ring, the lower ends of said prongs being flush with the bottom of said first named ring and conforming with and being confined in the respective notches which are provided therefor.

ZACK T. PERDUE, JR.

REFERENCES CITED

The following references are of record in the file of this patent:

UNITED STATES PATENTS

| Number | Name | Date |
|---|---|---|
| 943,767 | Bullard | Dec. 21, 1909 |
| 1,527,766 | Wellman et al. | Feb. 24, 1925 |
| 2,102,542 | Markle Jr. | Dec. 14, 1937 |
| 2,111,456 | Markle Jr. | Mar. 15, 1938 |
| 2,544,357 | Scavullo | Mar. 6, 1951 |

FOREIGN PATENTS

| Number | Country | Date |
|---|---|---|
| 6,624 | Great Britain | Apr. 1, 1895 |
| 190,416 | Great Britain | Dec. 21, 1922 |
| 599,182 | Germany | June 27, 1934 |